United States Patent [19]

Iwata et al.

[11] 4,269,154
[45] May 26, 1981

[54] IGNITION TIMING CONTROL SYSTEM FOR INTERNAL COMBUSTION ENGINES

[75] Inventors: Toshiharu Iwata, Aichi; Tadashi Hattori; Siniti Mukainakano, both of Okazaki; Kenji Goto; Daisaku Sawada, both of Susono, all of Japan

[73] Assignees: Nippon Soken, Inc., Nishio; Toyota Jidosha Kogyo Kabushiki Kaisha, Toyota, both of Japan

[21] Appl. No.: 41,933

[22] Filed: May 23, 1979

[30] Foreign Application Priority Data

May 24, 1978 [JP] Japan .................................. 53-62030
Jun. 13, 1978 [JP] Japan .................................. 53-71249

[51] Int. Cl.³ .............................................. F02P 5/14
[52] U.S. Cl. ..................................... 123/425; 123/416
[58] Field of Search ....... 123/117 D, 117 R, 146.5 A, 123/148 E, 119 ED

[56] References Cited

U.S. PATENT DOCUMENTS

| | | | |
|---|---|---|---|
| 3,871,342 | 3/1975 | Fujinami et al. ............. | 123/146.5 A |
| 4,002,155 | 1/1977 | Harned et al. .................... | 123/148 E |
| 4,061,116 | 12/1977 | Saida et al. ...................... | 123/117 R |
| 4,120,272 | 10/1978 | Douaud et al. .................. | 123/117 R |
| 4,153,020 | 5/1979 | King et al. ..................... | 123/146.5 A |

Primary Examiner—Charles J. Myhre
Assistant Examiner—Andrew M. Dolinar
Attorney, Agent, or Firm—Cushman, Darby & Cushman

[57] ABSTRACT

An ignition timing control system including a counter into which is introduced a data generated from a memory and indicative of the proper ignition advance corresponding to the operating conditions of an engine and the decrement or increment of the count is made in synchronism with predetermined degrees of rotation of the engine to determine the desired ignition timing. When knock occurs n times per m times of engine explosion stroke, the knocking ratio n/m is computed and the content of the counter is corrected in response to the value of the knocking ratio to correct the ignition timing. The value of m for the knocking ratio n/m is variable in accordance with the engine operating conditions.

3 Claims, 11 Drawing Figures

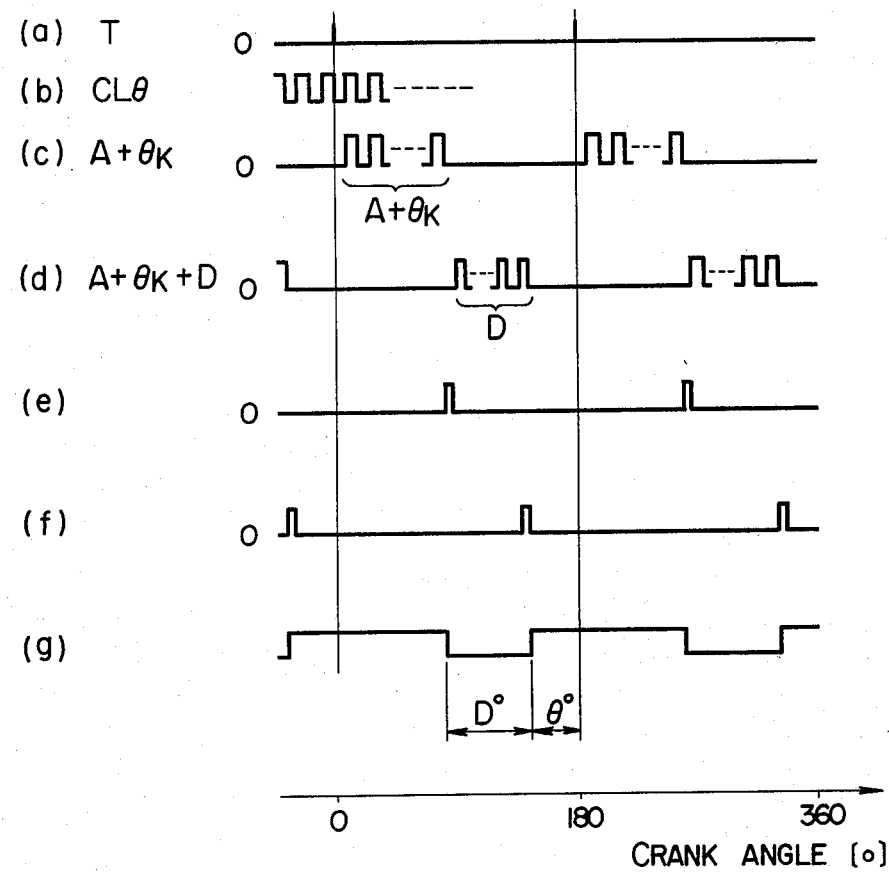
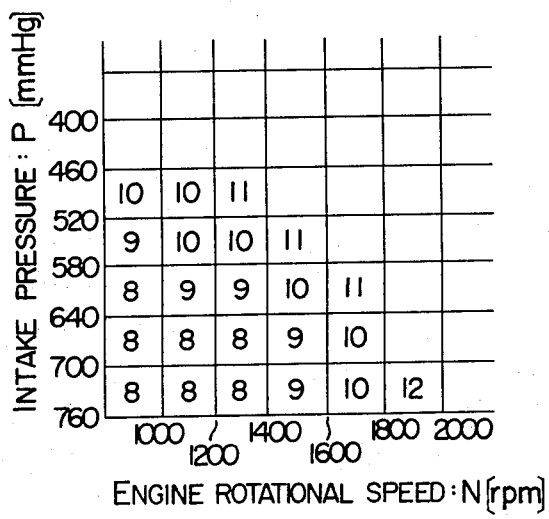
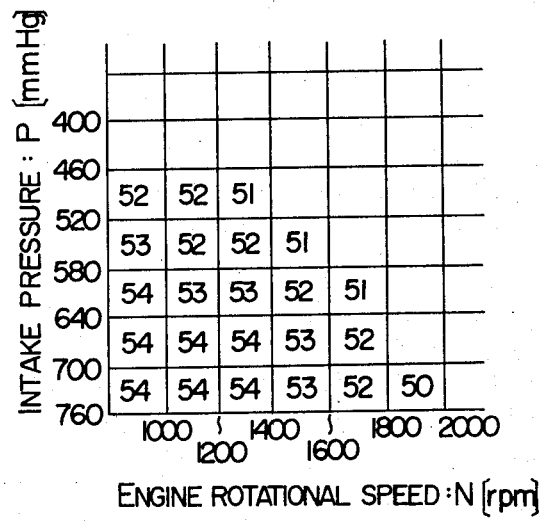

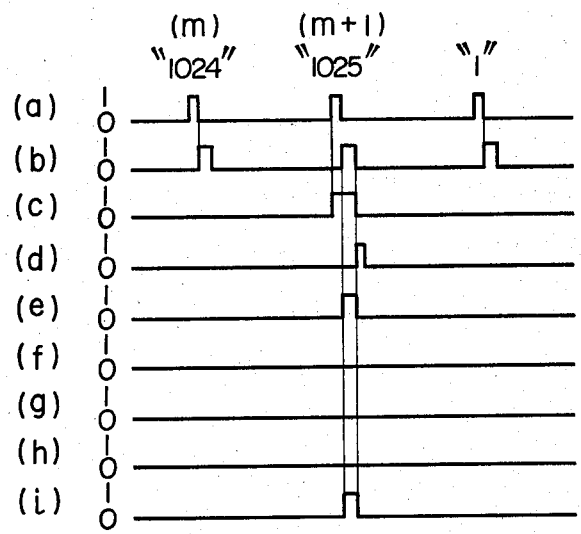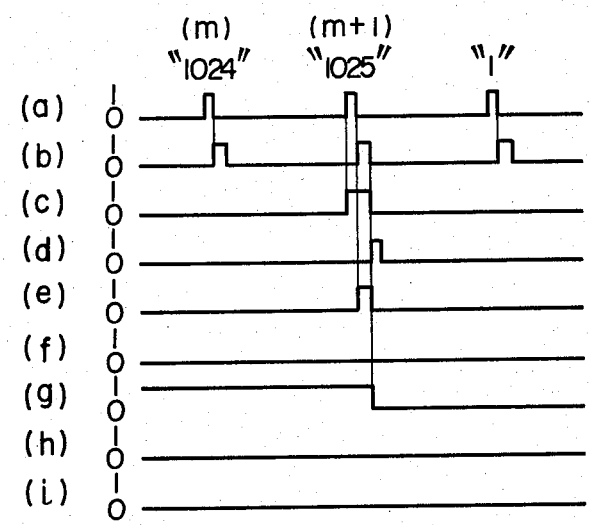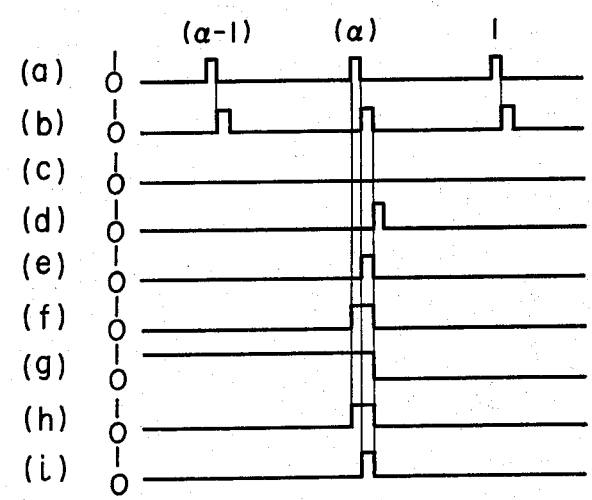

IGNITION TIMING CONTROL SYSTEM FOR INTERNAL COMBUSTION ENGINES

BACKGROUND OF THE INVENTION

The present invention relates to an ignition timing control system for internal combustion engines which retards the ignition timing when knocking signals, generated in response to the detection of knocking by means of vibration or sound caused inside and outside the cylinders of an engine due to the pressure therein are detected.

The ignition timing of an engine must be determined in accordance with the engine conditions so as to ensure the optimum operation of the engine. Ignition timing control systems known in the art are generally so designed that the ignition timing is controlled in accordance with the conditions of an engine which are represented by the engine's speed, as detected by its centrifugal advance mechanism and the engine's intake vacuum, as detected by its vacuum advance mechanism.

It is known in the art that generally, to achieve optimum engine efficiency and fuel consumption, ignition should occur at a position near a so-called MBT (the Minimum advance for Best Torque) and consequently it is necessary to adjust the ignition timing to the MBT in accordance with the engine operating conditions.

However, if the ignition timing is advanced gradually under certain engine conditions, knocking will result and stable operation of the engine will be made impossible. Generally, the relation between the MBT and the knock initiating ignition timing is such that the knocking limit is reached before the MBT under low speed and low load operation. Also, the knocking limit tends to be influenced by atmospheric conditions, such as temperature, humidity, etc., and consequently the ignition timing control systems now in use are so programmed that the ignition timing is controlled in accordance with the engine parameters comprising the engine speed and the intake vacuum so as to be retarded considerably with respect to the MBT to prevent the occurrence of knock under all of the possible operating conditions of the engine. As a result, the output as well as the fuel consumption are not optimized.

The existance of a close correlation between ignition timing and cylinder pressure is well known in the art, that is, when a mixture is exploded in the cylinder, no harmonic components (frequency components which are usually on the order of 5 to 10 KHz) are superimposed on the cylinder pressure when there is no knocking, but such harmonic pressure variations are caused when knocking occurs.

The effect of such harmonic pressure variations is the generation of vibration or sound to the outside of the cylinder. Many different types of so-called knock feedback ignition systems have been investigated in which the ignition timing is controlled by detecting such vibration or sound.

A known system of this type is designed so that the presence of knocking is detected for every explosion stroke of each cylinder, whereby the ignition timing is controlled in response to each combustion phenomenon or detection signal in such a manner that the ignition timing is retarded by a predetermined angle upon occurrence of knocking and the ignition timing is advanced by a predetermined angle when it is determined that there is no knocking condition.

A great disadvantage of this type of system is that when the feedback is applied in a multi-cylinder engine, due to the difference in intake system for fuel distribution, mixture distribution, etc., among the cylinders as well as the difference in combustion chamber condition (deposit, compression ratio, etc.) among the cylinders, there occurs a great variation in combustion among the cylinders thus increasing the hunting range of the ignition timing and thereby causing surging and slugging.

SUMMARY OF THE INVENTION

In view of these deficiencies in the prior art, it is the object of the invention to provide an improved ignition timing control system for internal combustion engines wherein the explosion stroke of an engine is sampled several tens of times to feedback control the ignition timing in response to the number of actual occurrences of knock, and wherein the frequency of sampling is varied in accordance with the operating conditions (high acceleration, high speed, or heavy load) of the engine to obtain the optimum ignition timing.

BRIEF DESCRIPTION OF THE DRAWINGS

FIG. 2 is a waveform diagram useful in explaining the operation of the embodiment shown in FIG. 1.

FIGS. 3 and 4 are characteristic programming diagrams of the embodiment shown in FIG. 1.

FIGS. 9, 10 and 11 are time charts useful for explaining the operation of the circuits shown in FIG. 8.

DESCRIPTION OF THE PREFERRED EMBODIMENTS

The present invention will now be described in greater detail with reference to the illustrated embodiments.

Figure 1:
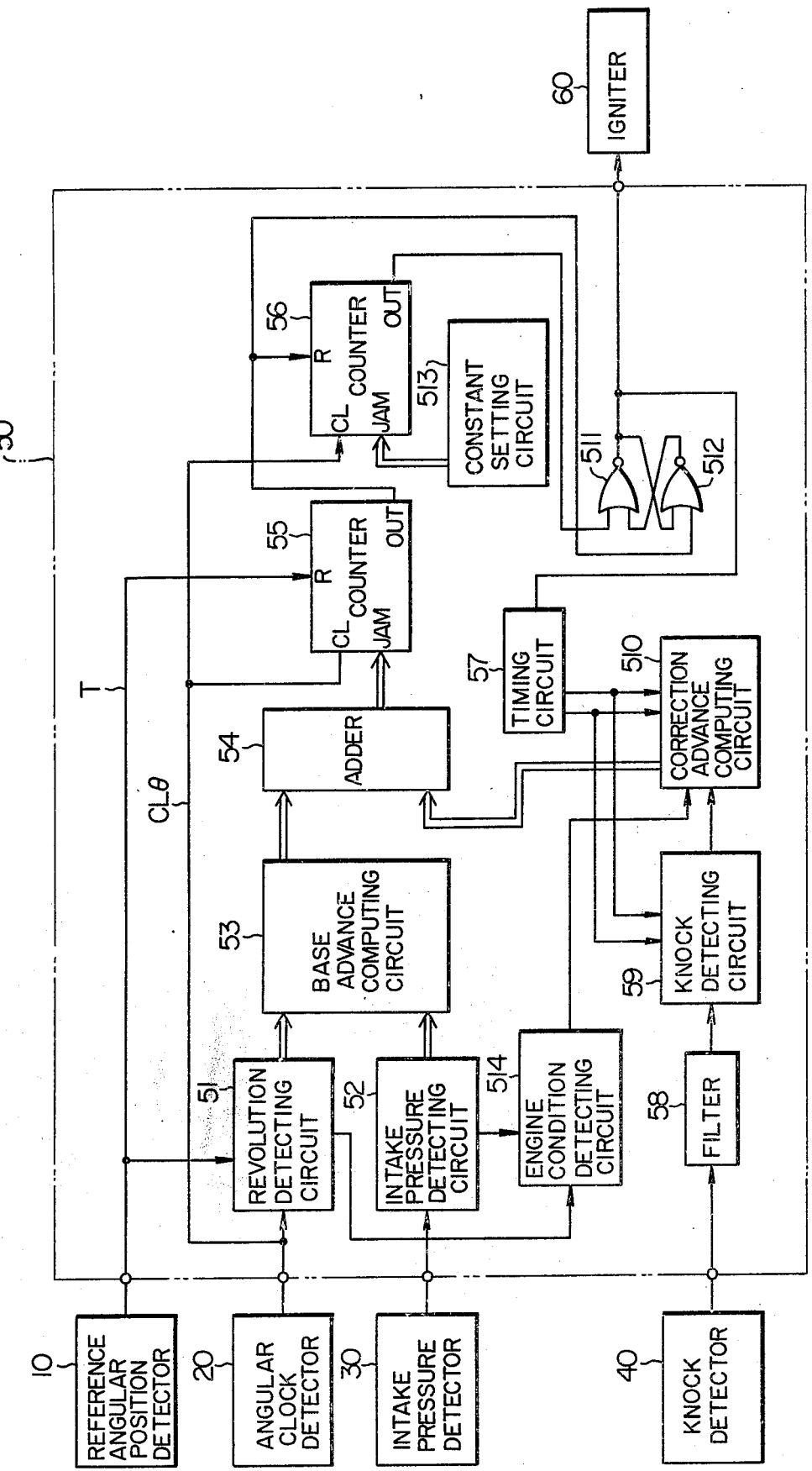
FIG. 1 is a block diagram showing a first embodiment of an ignition timing control system according to the invention.

Referring to FIG. 1, showing a block diagram for a first embodiment of the invention, numeral 10 designates a reference angular position detector for generating a crankshaft reference angular position signal T (two signals at equal intervals for every revolution of a four cylinder, four cycle engine), 20 an angular check detector for detecting an angular position corresponding for example to one degree of crankshaft rotation, and 30 an intake pressure detector for detecting the pressure in the intake manifold of the engine. Numeral 40 designates a knock detector whereby the vibration or sound wave of the engine body which is associated with an engine knocking phenomenon is detected by a piezoelectric element method (piezoelectric element), generation method (magnet, coil) or the like. Numeral 50 designates an ignition advance computing circuit connected to the reference angular position detector 10, the angular clock detector 20, the intake pressure detector 30 and the knock detector 40 to control the ignition timing in accordance with the engine conditions. Numeral 60 designates an igniter for subjecting the output signal of the ignition advance computing circuit 50 to current amplification so as to energize and deenergize the ignition coil (not shown).

The ignition advance computing circuit 50 comprises a revolution detecting circuit 51 for detecting the rotational speed of the engine in response to the signal from the reference angular position detector 10, an intake pressure detecting circuit 52 for detecting the engine intake pressure in response to the signal from the intake pressure detector 30, a base advance computing circuit 53 adapted to receive the rotational speed signal N from the revolution detecting circuit 51 and the intake pressure signal P from the intake pressure detecting circuit 52 and comprising a read-only memory (hereinafter referred to an an ROM) storing a predetermined program of advance angles in terms of retard angles from a reference angular position, a filter 58 comprising a band-pass filter, high-pass filter or the like for separating and transmitting only a knocking frequency component from the output of the knock detector 40, a knock detecting circuit 59 for detecting the presence of knocking in response to the output of the knock detector 40 which is transmitted through the filter 58, a correction advance computing circuit 510 for computing an advance correction value in response to the signal from the knock detecting circuit 59 which is indicaive of the presence or absence of knocking, a timing circuit 57 for supplying various timing signals to the knock detecting circuit 59 and the correction advance computing circuit 510, an adder 54 for adding the programmed value from the base advance computing circuit 53 and the correction value from the correction advance computing circuit 54, counters 55 and 56 each having preset data input teminals JAM, a constant setting circuit 513 for determining the operating angle or dwell angle D of the ignition coil, NOR circuits 511 and 512 forming a flip-flop, and an engine condition detecting circuit 514 for receiving the rotational speed signal N from the revolution detecting circuit 51 and the intake pressure signal P from the intake pressure detecting circuit 52. The engine condition detecting circuit 514 detects any engine operating condition, such as an acceleration or high speed operation (or any running condition of the vehicle driven by the engine) which tends to cause knocking and any difficulty due to knocking, so as to change the number of times of combustion stroke for detecting the ratio of the number of occurrences of knock in the correction advance computing circuit 510.

Next, the operation of the embodiment excluding the timing circuit 57, the filter 58, the knock detecting circuit 59, the correction advance computing circuit 510 and the engine condition detecting circuit 514, will be described with reference to the time chart of FIG. 2. The reference angular position detector 10 generates the reference angular position signal T shown in (a) of FIG. 2 (two signals for each revolutions of the crankshaft) at the top dead center position of each cylinder. The angular clock detector 20 generates the angular signal $CL\theta$ shown in (b) of FIG. 2 and corresponding to one degree of crankshaft rotation. The advance angle values determined in accordance with the values of the rotational speed signal N from the revolution detecting circuit 51 and of the intake pressure signal P from the intake pressure detecting circuit 52 are preliminarily stored in terms of retard angles from the reference position in the ROM. In other words, in accordance with a matrix diagram of desired advance angle values $\theta$ divided according to the values of the engine speed N and the intake pressure P as shown in FIG. 3, the values shown in FIG. 4 are each given by $A = 180 - \theta - \theta_{kO} - D$ ($62-\theta$, in this case) in consideration of the crankshaft reference angular position (180° BTDC in this case), the correction advance reference amount $\theta_{kO}$ (in this case computation is made with $\theta_{kO} = 10°$) and the dwell angle D (e.g., 108°) and these values are stored as the desired retard angles A in the ROM. For instance, a program is stored so that with the intake pressure in the range 760 to 700 mmHg, when the rotational speed N is 1200 to 1400 rpm $\theta = 8°$ BTDC and hence A=54°, when 1400 to 1600 rpm $\theta = 9°$ BTDC and hence A=53° and when 1600 to 1800 rpm $\theta = 10°$ BTDC and hence A=52°. With the intake pressure P in the range 580 to 520 mmHg, when the rotational speed N is 1200 to 1400 rpm $\theta = 10°$ BTDC and hence A=52°, when 1400 to 1600 rpm $\theta = 11°$ BTDC and hence A=51° and so on. In this case, the finer the matrix of programmed values, more satisfactory results will be obtained from the standpoint of accuracy but with the corresponding increase in the required capacity for the ROM. In such a case, the required ROM capacity can be reduced by interpolating any two programmed data in the ROM so as to obtain the intermediate value. It is only necessary to arrange so that in the previously mentioned case, for example, when the intake pressure is in the range 760 to 700 mmHg, A=54° and A=50° are selected respectively for N=1200 rpm and N=1800 rpm and $$A = \frac{50 - 54}{1800 - 1200} \times \Delta N + 54$$

is calculated (where $\Delta N$= detected rotational speed Nx−1200). The retard angle A from the base advance computing circuit 53 and the correction angle $\theta_k$ from the correction advance computing circuit 510 are added up by the adder 54 and the resulting sum $(A + \theta_k)$ is applied to the preset data input terminals JAM of the counter 55. The counter 55 is reset by a reference angular position signal T and it counts angular position signals $CL\theta$ as shown in (c) of FIG. 2. When the counter attains the number $(A + \theta_k)$, the output of the counter 55 goes from a "0" to "1" level as shown in (e) of FIG. 2. The output of counter 55 is coupled to the reset input of another counter 56 and to an input of a NOR gate 512 so that the NOR circuit 512 of the flip-flop is triggered and counter 56 is reset. After the counter 56 has been reset by the output of the counter 55, the counter 56 counts up to the preset number or D of the constant setting circuit 513 as shown in (d) of FIG. 2. When the preset number is attained, the output of the counter 56 goes from the "0" to "1" level as shown in (f) of FIG. 2 and the NOR circuit 511 of the flip-flop is triggered. The output of the NOR circuit 511 varies as shown in (g) of FIG. 2 and the output is coupled to the igniter 60. The time that the output of the counter 56 goes from the "0" to "1" level corresponds to the desired ignition timing and the time that the output of the counter 55 goes from the "0" to "1" level corresponds to the time that the energization of the ignition coil is started. The dwell angle represents the value of D° set by the constant setting circuit 513.

Figure 5:
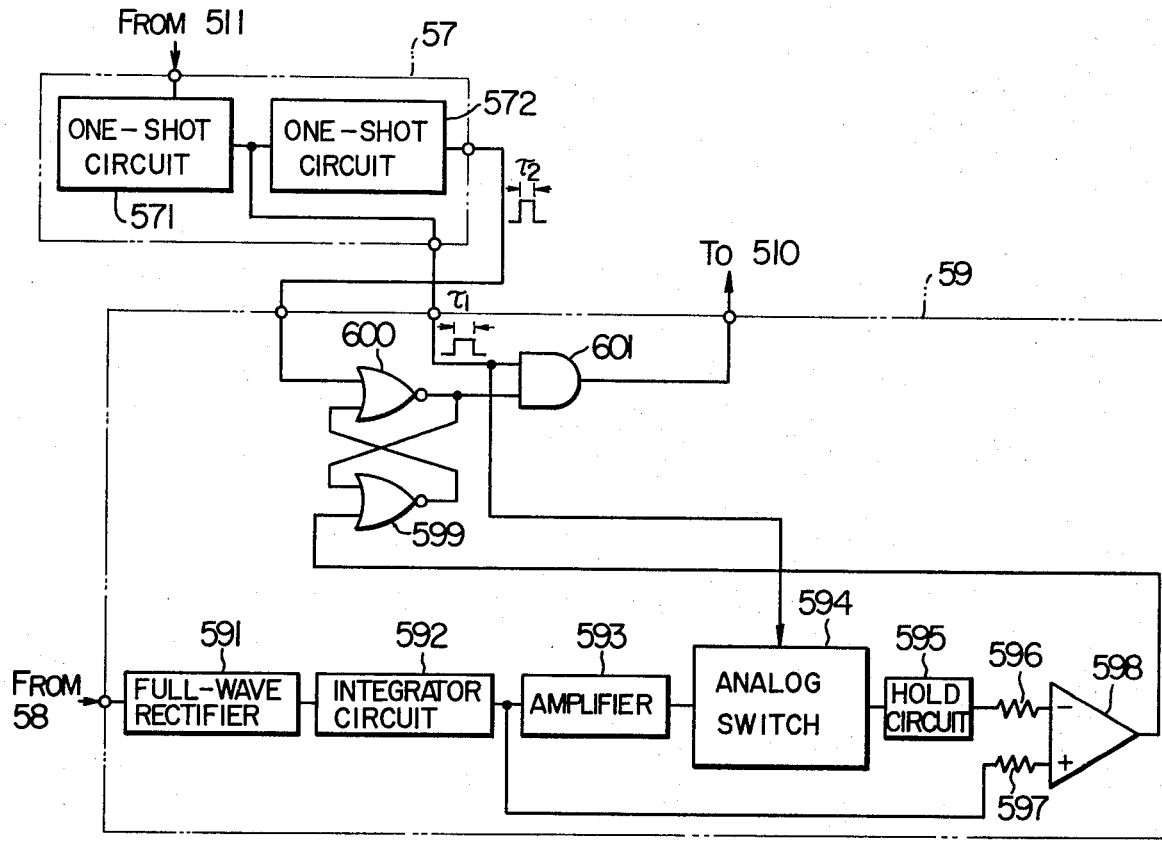
FIGS. 5 and 6 are circuit diagrams showing in detail the principal parts of the embodiment shown in FIG. 1.

Next, the detection of knocking by means of the timing circuit 57, the filter 58 and the knock detecting circuit 59 will be described. Referring to FIG. 5, the timing circuit 57 receives the output signal of the NOR circuit 511 connected to the igniter 60 and it comprises one-shot circuits 571 and 572. The one-shot circuit 571 generates a pulse signal which goes to the "1" level and has a time width $\tau_1$ as shown in (a) of FIG. 7 and the one-shot circuit 572 generates a pulse signal which goes to the "1" level in response to the negative-going transition of the pulse width $\tau_1$ of the one-shot circuit 571 and has a time width $\tau_2$. The outputs of the one-shot circuits 571 and 572 are coupled to the knock detecting circuit 59. The knock detecting circuit 59 receives, in addition to the previously mentioned timing signals, the vibration waveform of the preset bandwidth (5 to 10 KHz in the embodiment) applied thereto from the knock detector 40 through the filter 58. As shown in FIG. 5, the knock detecting circuit 59 comprises a full-wave rectifier circuit 591, an integrator circuit 592, an amplifier 593, an analog switch 594, a hold circuit 595 including a resistor and a capacitor which are not shown, input resistors 596 and 597, a comparator circuit 598, NOR circuits 599 and 600 and an AND circuit 601. The vibration input is full-wave rectified by the full-wave rectifier circuit 591 and smoothed by the integrator circuit 592 comprising a parallel combination of a capacitor and a resistor, thus generating and coupling the average value of the vibration input to the amplifier 593 and the resistor 597, respectively. The vibration input is amplified K times by the amplifier 593 and it is then applied to the hold circuit 595 through the analog switch 495 which is turned on during the $\tau_1$ times, thus causing the hold circuit 595 to generate an output representing the average vibration input of the $\tau_1$ time after each ignition. The output is applied to one input of the comparator circuit 598 through the resistor 596 and the output of the integrator circuit 592 is directly coupled to the other input of the comparator circuit 598. The vibration input memorized by hold circuit 595, during the $\tau_1$ time represents K times the average value of the base vibration including the noise signal and it is directly compared in signal magnitude with the vibration input. Because, immediately after the ignition no knocking phenomenon takes place until a flame core is formed. Consequently by selecting the time width $\tau_1$ to be less than time required for the formation of a flame core (usually less than 1 msec after the ignition), it is possible to detect the base vibration. When the combustion proceeds with the corresponding increase in the vibration input due to knocking, the vibration input is compared with K times the magnitude of the base vibration memorized to detect the occurrence of knocking. Generally, the base vibration increases with an increase in the engine rotational speed and it is also variable in dependence on the intake pressure. Thus, by using the method of this embodiment, it is possible to detect the base vibration under wide conditions of engine operation. Thus, in response to the occurrence of knock the output of the integrator circuit 592 becomes greater than a value which is K times the base vibration, with the result that the output of the comparator circuit 598 goes to the "1" level and the output is applied to one of the NOR circuits 599 and 600 forming the flip-flop, thus changing the output of the NOR circuit 600 to go to the "1" level. The output of the NOR circuit 600 is applied to the AND circuit 601 so that it is gated with the pulse of the time width $\tau_1$ and the pulse having the time width $\tau_1$ is generated upon the occurrence of knocking.

Figure 6:
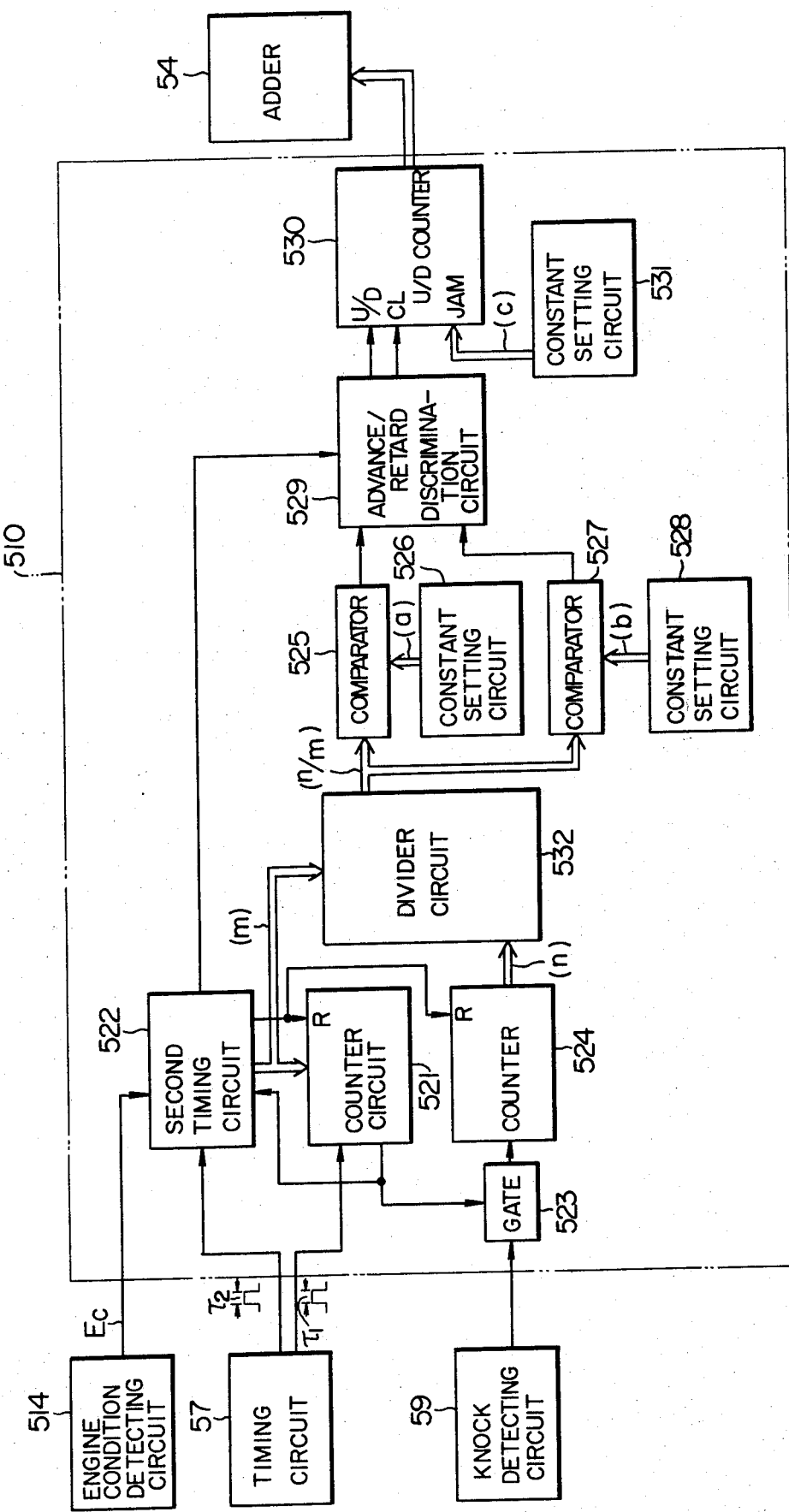

Referring now to FIG. 6, there is illustrated a detail circuit construction of the correction advance computing circuit 510. In the Figure, the correction advance computing circuit 510 comprises a counter circuit 521 for counting the pulses of the time width $\tau_1$ from the timing circuit 57 to change its output from the "0" to "1" level when the count exceeds a preset number (m+1), a second timing circuit 522 for receiving the pulse of the time width $\tau_2$ from the timing circuit 57, the engine condition signal from the engine condition detecting circuit 514 and the output of the counter circuit 521 to apply a timing signal to an advance/retard discrimination circuit 529, a signal indicative of the preset number m to the counter circuit 521 and a divider circuit 532 and a reset signal to the counter circuit 521 and a counter 524, a gate 523 for passing the output of the knock detecting circuit 521 only when the output of the counter circuit 521 goes to the "0" level, the counter 524 for counting the knock signals passed through the gate 523 to generate the resulting count number (n), the divider circuit 532 for receiving the preset number m of the second timing circuit 522 and the output n of the counter 524 to computer and generate an output n/m, a comparator 525 for comparing the output n/m of the divider circuit 532 with the preset number a of a constant setting circuit 526 to generate a "1" level output when n/m $\vee$ a and generate a "0" level output when n/m $\vee$ a, a comparator 527 for comparing the output n/m of the divider circuit 532 with the preset number b of a constant setting circuit 528 to generate a "1" level output when n/m $\vee$ b and generate a "0" level when n/m $\vee$ b (where a $\vee$ b), the advance/retard discrimination circuit 529 for receiving the timing signal from the second timing circuit 522, the output signal of the comparator 525 and the output signal of the comparator 527 to generate an up/down signal (U/D) and a clock signal (CL), and an U/D counter 530 for receiving the up/down signal (U/D) and the clock signal (CL) from the advance/retard discrimination circuit 529 and the preset number (c) from a constant setting circuit 521 to count up or count down the clock signals (CL) successively from the preset number (c) to generate the then current count number.

Figure 7:
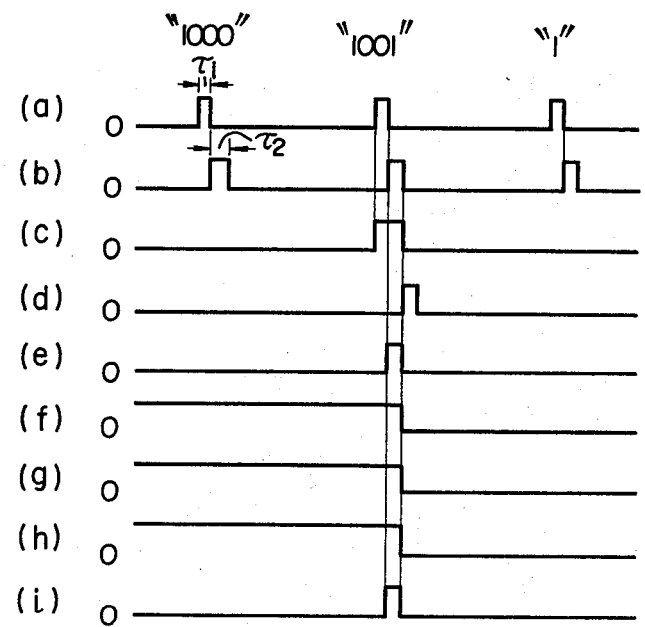
FIG. 7 is a waveform diagram useful in explaining the operation of the circuits shown in FIGS. 5 and 6.

Next, the operation of the correction advance computing circuit 510 will be described with reference to the time chart of FIG. 7. When the engine comes into an operation, such as an acceleration operation or high speed and load operation where there is a greater knocking tendency and where the occurrence of continuous knocking over a long period of time tends to result in a serious trouble, the engine condition detecting circuit 514 generates a "1" level engine condition signal Ec and a "0" level engine condition signal Ec is generated under all other conditions of engine operation. The second timing circuit 532 receives the engine condition signal Ec from the engine condition detecting circuit 514 in synchronism with the reset signal shown in (d) of FIG. 7 and this circuit applies to the counter circuit 521 the preset number m which becomes m=$m_1$ when the signal Ec goes to the "1" level or when the engine is at an acceleration or high speed and load operation and which becomes m=$m_2$ ($M_1 < m_2$) when the signal Ec goes to the "0" level or when the engine is at an operation other than the acceleration and high speed and load operations. The second timing circuit 522 selects a predetermined sampling frequency or number m (either $m_1$ or $m_2$). The sampling number m may be in the range of several tens to several tens of thousands or over. Assuming for purposes of description that the sampling rate is 1000, then the preset number of the counter circuit 521 is selected "1001" so that the counter circuit 521 counts the pulses of the time width $\tau_1$ shown in (a) of FIG. 7 and its output goes to the "1" level as shown in (c) of FIG. 7 in response to the positive-going transition of the 1001st pulse. When this occurs, the gate 523 is closed and by this time the counter 524 has counted as many knock signals as the number of times of knocking (n) during the thousand times of sampling. The divider circuit 532 computes and generates a knocking ratio n/m from the preset number m and the number of occurrences of knock n. When the output n/m is $n/m \geq a \geq b$, the comparators 525 and 527 each generates a "1" level output and the advance/retard discrimination circuit 529 generates a "1" level up signal as well as the clock signal (CL) shown in (i) of FIG. 7 or the timing signal generated from the second timing circuit 522 in synchronism with the 1001st pulse of $\tau_2$ as shown in (e) of FIG. 7. The U/D counter 530 receives the up signal and the clock signal so that the count is increased by 1 and the resulting count number is applied as a correction angle $\theta_k$ to the adder 54. Consequently, the content of the counter 55 or the preset data applied through the input terminals JAM is increased by 1 so that the counter 55 counts out later then previously by 1 count and the ignition timing is retarded by 1° crank angle. When the knocking ratio n/m is $a > n/m \geq b$, the comparator 525 generates a "0" level output and the comparator 527 generates a "1" level output. In this case, the advance/retard discrimination circuit 529 generates a "0" level down signal and the clock signal remains at the "0" level generating no pulse. As a result, the same count number as previously applied is again applied by the U/D counter 531 to the adder 54 and the advance angle is not changed. When the knocking ratio n/m is $a \geq b \geq n/m$, the comparators 525 and 527 respectively generates a "0" level output as shown in (f) and (g) of FIG. 7. When this occurs, the advance/retard discrimination circuit 529 generates a "0" level down signal and the same clock signal (CL). Consequently, the U/D counter 530 decreases its count by 1 so that the content of the counter 55 or the preset data applied through the input terminals JAM is decreased by 1 and the counter 55 counts out earlier than previously by 1 count, thus advancing the ignition timing by 1° crank angle. The reset signal from the second timing circuit 522 is a short pulse which goes to the "1" level in response to the negative-going transition of the 1001st pulse of $\tau_2$ as shown in (d) of FIG. 7, and the reset pulse resets the counter circuit 521 and the counter 524, thus starting the next thousand times of sampling.

If the first thousand times of sampling resulted in $n/m \geq a \geq b$ thus retarding the ignition timing by 1° sampling results in the same $n/m \geq a \geq b$, the count number of the U/D counter 530 will be increased by 2 thus eventually retarding the ignition timing by 2° crank angle. In this way, the count number of the U/D counter 530 is varied and the advance angle is adjusted to come within the range of the preset knocking ratio $a > n/m \geq b$. In this case, the preset numbers a and b should each preferably have a knocking ratio of several %, and by selecting for example a=0.05 and b=0.02, it is possible to effect the feedback control so that a trace knocking condition is always ensured in which the frequency of occurrence of knock is held in the range of 2 to 5% on an average.

On the other hand, the preset sampling rate m generated from the second timing circuit 522 is such that it has a relatively small value $M_1$ during the periods of acceleration or high speed and load operation and it is selected to have a large value $m_2$ ($m_1 < m_2$) under all other conditions of operation, thus accomplishing the feedback control at a shorter period under acceleration operation or high speed and load operation on which the effect of knocking is considerably large and thereby protecting the engine from heavy knocking. If, for example, it is selected so that $m_1 = 50$ and $m_2 = 1000$, when the engine rotational speed is 3000 rpm, the ignition timing will be corrected at intervals of 0.5 seconds and 10 seconds, respectively, and particularly during the periods of acceleration or high speed and load operation a faster response is ensured thus preventing the knocking ratio from increasing. When $m_1 = 50$, the operation is the same as in the previously mentioned case of $m_2 = 1000$. On the other hand, any change in the engine condition during the sampling will result in no inconvenience, if it is arranged so that when a change in the engine condition causes the preset number or rate m to change from $m_1$ to $m_2$ or from $m_2$ to $m_1$, the second timing circuit 522 generates the next sampling preset number $m_1$ or $m_2$ in synchronism with the reset signal shown in (d) of FIG. 7.

While, in the above-described first embodiment, the conditions of engine operation are detected by dividing the engine conditions into two classes, i.e., the acceleration and high speed and load operations and the other conditions of operation, a finer division of the engine conditions into three or more classes may be used to determine the corresponding sampling preset values m, or alternatively as a more simple means of detection, a vacuum switch comprising a diaphragm or the like may be used to discriminate the acceleration and high speed and load operations from the other conditions of operation by means of the negative pressure in the intake manifold in such a manner that the acceleration or high speed and load operation is detected when the value of the negative pressure is low and the other conditions are detected when the negative pressure is high.

Figure 8:
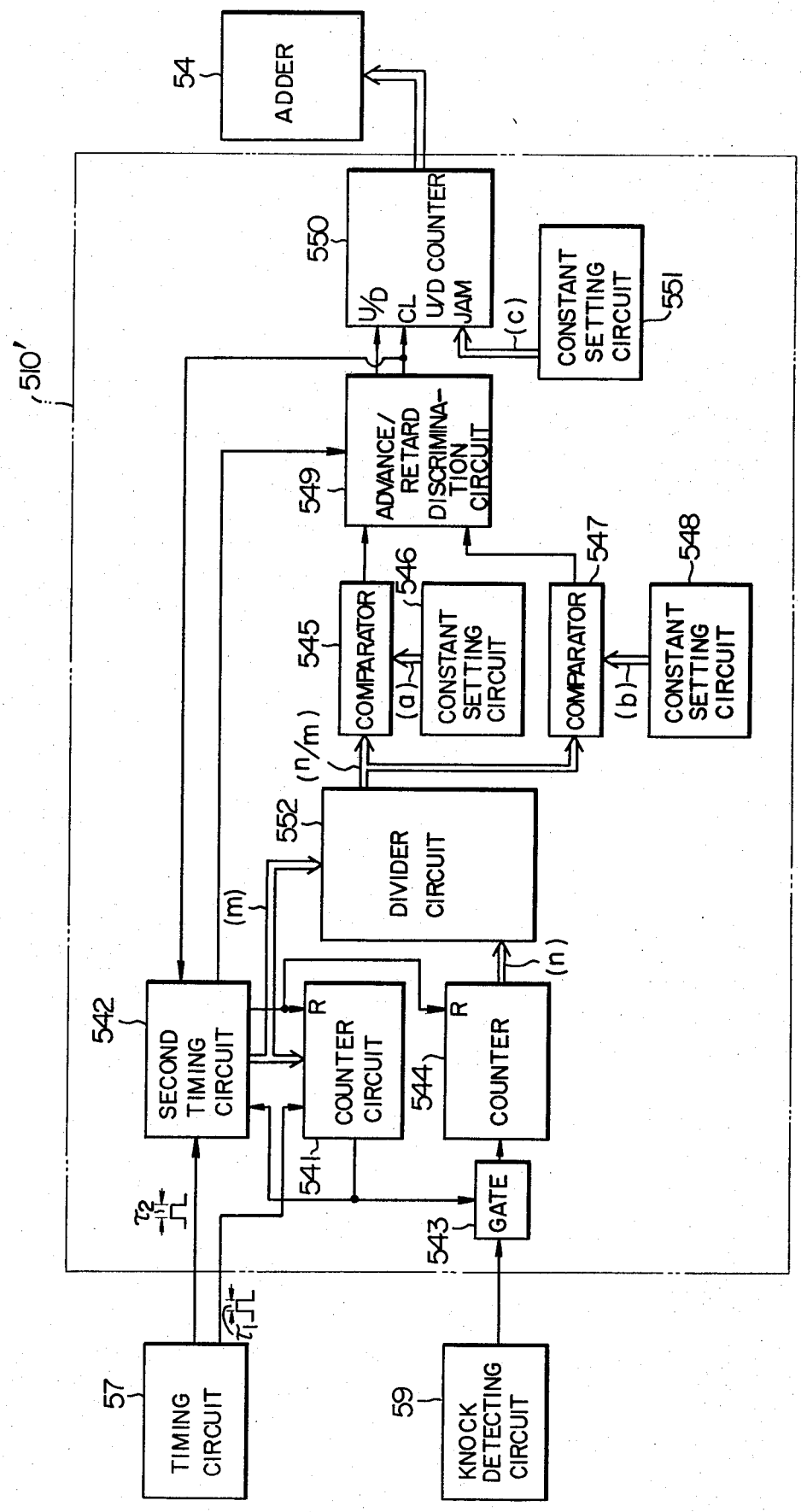
FIG. 8 is a block diagram showing another embodiment of the correction advance computing circuit used in the embodiment of FIG. 1.

A second embodiment of the system according to the invention will now be described. The second embodiment of the system of this invention differs from the first embodiment in that the engine condition detecting circuit 514 of FIG. 1 is eliminated and the correction advance computing circuit 510 of FIG. 1 is replaced with a circuit designated at 510' in FIG. 8. The operation of the correction advance computing circuit 510' will now be described. In FIG. 8, the correction advance computing circuit 510' comprises a counter circuit 541 for counting the pulses of $\tau_1$ from the timing circuit 57 to change its output to the "1" level when the count exceeds a preset number (m+1), a second timing circuit 542 for receiving the pulses of $\tau_2$ from the timing circuit 57, the output of the counter circuit 541 and the up/down signal from an advance/retard discrimination circuit 549 to apply a signal indicative of a preset number m to the counter circuit 541 and a divider circuit 552, a reset signal to the counter circuit 541 and a counter 544, respectively, and a timing signal to the advance/retard discrimination circuit 549, a gate 543 for passing the output of the knock detecting circuit 59 only when the output of the counter circuit 541 goes to the "0" level, the counter 544 for counting the knock signals passed through the gate 543 to generate the resulting count number (n), the divider circuit 552 for receiving the preset number m from the second timing circuit 542 and the output n of the counter 544 to compute and generate an output n/m, a comparator 545 for comparing the output n/m of the divider circuit 552 with the preset number a of a constant setting circuit 546 to generate a "1" level output when $n/m \geq a$ and generate a "0" level output when $n/m \geq a$, a comparator 547 for comparing the output $n/m$ of the divider circuit 552 with the preset number b of a constant setting circuit 548 to generate a "1" level output when $n/m \geq b$ and generate a "0" level output when $n/m < b$ (where $a \geq b$), the advance/retard discrimination circuit 549 for receiving the timing signal from the second timing circuit 542, the output signal of the comparator 545 and the output signal of the comparator 547 to generate an up/down signal (U/D) and a clock signal (CL), and an up/down (U/D) counter 550 for receiving the up/down signal (U/D) and the clock signal from the advance/retard discrimination circuit 549 and the preset number c of a constant setting circuit 551 to count up or count down the clock signals (CL) successively from the preset number c and thereby to generate the then current count number.

The operation of the second embodiment will now be described with reference to the time charts of FIGS. 9 to 11.

The second timing circuit 542 selects a predetermined number of times of sampling m. Assuming for purposes of description that the number of times of sampling is 1024, the preset number of the counter circuit 541 is selected "1025" so that the pulses of $\tau_1$ shown in (a) of FIG. 9, (a) of FIG. 10 and (a) of FIG. 11 are counted by the counter circuit 541 and its output goes to the "1" level as shown in (c) of FIG. 9 and (c) of FIG. 10 in response to the positive-going transition of the 1025th pulse. When this occurs, the gate 543 is closed and by this time as many knock signals as the number of times of knocking (n) during the 1024 times of sampling have been counted by the counter 544. The divider circuit 552 computes and generates the knocking ratio $n/m$ from the preset number m and the number of times of knocking n.

When the output $n/m$ is $n/m < b \leq a$, the comparators 545 and 547 each generates a "0" level signal as shown in (f) and (g) of FIG. 9 and the advance/retard discrimination circuit 549 generates the "0" level down signal shown in (h) of FIG. 9 and the clock signal shown in (i) of FIG. 9 or the timing signal shown in (e) of FIG. 9 and synchronized with the 1025th pulse of $\tau_2$.

The U/D counter 550 receives the down signal and the clock signal so that the count is decreased by 1 and the resulting count number is applied as the desired correction angle $\theta_k$ to the adder 54. Consequently, the content of the counter 55 or the preset data applied through the input terminals JAM is decreased by 1 with the result that the counter 55 counts out earlier than previously by 1 count and the ignition timing is advanced by 1° crank angle.

In this case, the second timing circuit 542 generates a reset signal consisting of a short pulse which goes to the "1" level in response to the negative-going transition of the 1025th pulse of $\tau_2$ as shown in (d) of FIG. 9, so that the counter circuit 541 and the counter 544 are reset and simultaneously the preset number applied to the counting circuit 541 and the counter 552 is reduced to half or 512 and the next number of times of sampling is reduced to 512. When the knocking ratio $n/m$ produced by the next 512 times of sampling results in $n/m < b \leq a$, in the same manner as mentioned previously the U/D counter 550 decreases the count by 1 and the content of the counter 55 or the present data applied through the input terminals JAM is further decreased by 1, thus further advancing the ignition timing by 1° crank angle.

At this time the second timing circuit 542 generates a reset signal and simultaneously the preset number of times of sampling is again reduced to half or 256.

When the knocking ratio $n/m$ becomes $a > n/m \geq a$, the comparator 545 generates a "0" lever output as shown in (f) of FIG. 10 and the comparator 547 generates a "1" output as shown in (g) of FIG. 10.

When this occurs, the advance/retard discrimination circuit 549 generates a "0" level down signal as shown in (h) of FIG. 10 and the clock signal remains at the "0" level as shown in (i) of FIG. 10 generating no pulse. As a result, the U/D counter 550 does not change its count number so that the previous count number is applied as such to the adder 54 and the advance angle remains unchanged. When the 1024 times of sampling are completed so that the knocking ratio $n/m$ becomes $a > n/m \geq b$, the second timing circuit 542 generates a reset signal consisting of a short pulse which goes to the "1" level in response to the negative-going transition of the 1025th pulse of $\tau_2$ as shown in (d) of FIG. 10, so that the counting circuit 541 and the counter 544 are reset and the next 1024 times of sampling are started.

When the knocking ratio $n/m$ becomes $n/m \geq a$ during the 1024 times of sampling, assuming that this has occurred in response to the $\alpha$th sampling, the output of the comparator 545 goes to the "1" level as shown in (f) of FIG. 11 in response to the positive-going transition of the $\alpha$th pulse of $\tau_1$. Since $n/m \geq a \geq b$, the output of the comparator 547 is at the "1" level as shown in (g) of FIG. 11. In this case, the advance/retard discrimination circuit 549 generates the "1" level signal shown in (h) of FIG. 11 and the clock signal shown in (i) of FIG. 11 or the timing signal from the second timing circuit 542 synchronized as shown in (e) of FIG. 11 with the $\alpha$th pulse of $\tau_2$ shown in (b) of FIG. 11.

As a result, the U/D counter 550 increases the count by 1 so that the content of the counter 55 or the preset data applied through the input terminals JAM is increased by 1 and the counter 55 counts out later than previously by 1 count, thus retarding the ignition timing by 1° crank angle. In this case, the second timing circuit 542 generates a reset signal consisting of a short pulse which goes to the "1" level in response to the negative-going transition of the $\alpha$th pulse of $\tau_2$ as shown in (d) of FIG. 11, with the result that the counter circuit 541 and the counter 544 are reset and simultaneously the preset number applied to the counter circuit 541 and the divider circuit 552 are reduced to half or 512, thus reducing the next number of times of sampling to 512.

When the knocking ratio $n/m$ becomes $n/m \geq a$ in the course of this 512 times of sampling, in the like manner as mentioned previously the U/D counter 550 increases the count by 1 so that the content of the counter 55 or the input data applied through the input terminals JAM is further increased by 1 and thus the ignition timing is retarded further by 1° crank angle. When this occurs, the second timing circuit 542 generates a reset signal and simultaneously the next number of times of sampling is again reduced to half or 256.

While, as above described, the preset number of times of sampling is reduced to half each time the knocking ratio $n/m$ becomes $n/m < b$ thus advancing the ignition timing by 1° crank angle or each time the knocking ratio $n/m$ becomes $n/m \geq a$ thus retarding the ignition timing by 1° crank angle, when the knocking ratio becomes $a > n/m \geq b$ during the next sampling operation, the preset number of times of sampling is successively increased twofold and returned to the initial preset number.

In this way, the count number of the U/D counter 550 is suitably varied and the advance angle is adjusted to come within the preset knocking ratio of $a > n/m \geq b$.

On the other hand, where the frequency of occurrence of knocking increases at a time thus retarding the ignition timing or decreases at a time thus advancing the ignition timing, the next number of times of sampling is decreased and the detection of knock is accomplished more rapidly, thus eliminating any overadvanced or overretarded ignition timing in a short period of time.

In this case, the preset numbers a and b should preferably be on the order of several %, and consequently if, for example, it is selected so that $a = 0.05$ and $b = 0.02$, it is possible to effect the feedback control to always ensure a trace knocking condition where the frequency of occurrence of knocking is held in the range of 2 to 5% on an average.

While, in the above-described first and second embodiments, the knocking detector 40 has been described as one which detects the vibration of an engine, it may be in the form of a microphone which detects the knocking sound.

Also, the vibration sensor may be any one of various types including an acceleration type, speed type, position displacement type, etc.

Further, while, in the event that the frequency of occurrence of knocking is increased thus retarding the ignition timing or the frequency of occurrence of knocking is decreased thus advancing the ignition timing the next number of times of sampling is reduced to half, it is also effective to reduce the number by a predetermined number in such cases.

Further, while the number of times of sampling is reduced in either of the case where the frequency of occurrence of knocking is increased thus retarding the ignition timing and the case where the frequency of occurrence of knocking is decreased thus advancing the ignition timing, it is necessary to reduce the number of times of sampling only in one or the other of these cases.

It is understood that other means may be employed in carrying out the invention. For example, the invention contemplates the use of a central processing unit associated with a program memory which stores instructions for instructing various input-output circuits, the central processing unit and so forth to perform the function described with reference to the embodiments.

We claim:

1. In an ignition timing control system for an internal combustion engine including means for detecting a first set of engine operating parameters and for generating an engine condition signal indicative thereof; means, responsive to said engine condition signal, for computing a base advance angle and for generating a digital signal representative thereof; first counter means for counting the digital signal from said base advance computing means and for generating an output signal when said first counter means reaches a predetermined count value; and igniter means, responsive to the output signal of said first counter means, for generating an ignition signal; the improvement comprising:

means for detecting the occurrence of an engine knock and generating a knock detection signal indicative thereof;

second counter means for counting the number of output signals from said first said counter means and for generating an output signal when a number m of said output signals from said first counter are counted;

timing means, connected to said second counter means, for determining the number m to which said counter means counts;

third counter means, connected to said knock detecting means and to said counter means, for counting the number n of said knock detection signals during a period that said second counter means counts the number m;

dividing means, connected to said timing means and to said third counter means, for computing a knocking ratio expressed by n/m;

comparator means, connected to said dividing means, for comparing the knocking ratio n/m with an upper and a lower level; and means, connected to said comparator means and to said first counter means, for altering the count value of said first counter means in accordance with a comparison result from said comparator means.

2. An improvement according to claim 1 further comprising second means, connected to said timing means, for detecting a second operating condition of said engine, said timing means varying said number m in response to an output signal of said second engine operating condition detection means.

3. An improvement according to claim 1 wherein said timing means is connected to an output of said comparator means, said timing means varying said number m in accordance with a comparison result of said comparator means.

* * * * *